Patented Apr. 29, 1941

2,240,040

UNITED STATES PATENT OFFICE 2,240,040

STABILIZATION OF ETHERS

John Hooton, Linden, N. J., assignor to Standard Oil Development Company, a corporation of Delaware No Drawing. Application April 15, 1939, Serial No. 268,018

2 Claims. (Cl. 23—250)

The present invention relates to stabilized ether compositions. The invention is more particularly concerned with ether compositions having a high resistivity to oxidation in the presence of light and heat. The stabilized compositions of the present invention comprise an ether, preferably an iso-ether, and a relatively small amount of an alcohol, preferably a secondary alcohol.

It is well known that various ethers, as for example, isopropyl ether and the like, are valuable for various purposes. However, these ethers have the disadvantage that they readily oxidize under various storage and operating conditions to form undesirable deterioration products such as aldehydes, ketones, acids, as well as other impurities. The deterioration of ethers due to oxidation is particularly accelerated when the ethers are subjected to high temperatures and pressures. Various inhibitors have been employed in order to overcome the susceptibility of the ether to oxidation. These inhibitors have not been particularly desirable since they are relatively expensive and since a substantial quantity is usually required which affects other desirable properties of the ether.

I have now discovered an ether composition which may be readily employed in any service and which will not readily oxidize and decompose to undesirable aldehydes, ketones, acids and the like. The ether composition of my invention comprises an ether and an alcohol present in a sufficient amount to substantially increase the stability of the ether. Preferred compositions are those which comprise not less than 5% and not more than about 25% of alcohol, based upon the quantity of ether.

Although any ether may be used, preferred compositions are those in which alkyl ethers are used, as for example, dimethyl ether, diethyl ether, diamyl ethers, dihexyl ethers, didecyl ether, butyl ether, butyl hexyl ethers, diiosobutenyl ether, diisopentenyl ether and the like. Desirable results are secured when the alkyl group contains from one to five carbon atoms and especially when said group is branched. Suitable ethers of this type are, for example, diisoamyl ether, diisobutyl ether, di-secondary butyl ether, di-secondary amyl ethers and di-tertiary butyl ether.

The alcohol employed is preferably a monohydroxyl alcohol containing from one to six carbon atoms in the molecule. In general, it is desirable to use a secondary or tertiary alcohol, as for example, secondary butyl alcohol, secondary amyl alcohol, tertiary amyl alcohol and the like. For example, it has been found that especially desirable results are secured when the composition comprises diisopropyl ether and from 5% to 25% of secondary butyl alcohol, based upon the volume of ether present.

In general, it is preferred to add a small quantity of an oxidation inhibitor, as for example, tricresyl, benzyl amino phenol, alpha naphthol, beta naphthol and similar oxidation inhibitors. These are illustrative of phenolic oxidation inhibitors that are known in the art for use in preventing oxidation of various organic compounds. The quantity added will depend upon the particular ether and alcohol being used, as well as upon the particular oxidation inhibitor used. In general, it is preferred to use from 2 to 8 mg. of inhibitor per 100 cc. of ether alcohol composition. However, if alpha naphthol is used, the preferred quantity of inhibitor is from 3 to 7 mg. of alpha naphthol per 100 cc. of ether alcohol composition. If benzyl amino phenol be used, it is preferred to use from 2 to 3 mg. and not over 4 mg. of inhibitor per 100 cc. of ether alcohol composition.

The stabilized ether compositions of the present invention may be used as such or may be blended with other materials. For example, the ether composition of the present invention may be blended with liquid petroleum hydrocarbons in order to produce a high octane number, oxidation resistant, high quality motor fuel. The stabilized ether composition is particularly desirable in the preparation of a petroleum oil ether fuel, since the alcohol materially increases the resistivity of the ether to oxidation under the extreme conditions prevailing in internal combustion engines without lowering the octane number.

In order to further illustrate the invention, the following example is given which should not be construed as limiting the invention in any manner whatsoever:

*Example 1*

The stability of isopropyl ether was determined by measuring the breakdown time* in minutes. Other portions of isopropyl ether were blended with secondary butyl alcohol, with an oxidation inhibitor and with secondary butyl alcohol and an oxidation inhibitor respectively. The breakdown times on the respective blends were determined with the following results:

| Blend | Inhibitor (mg. alpha naphthol per 100 cc.) | Volume, percent | | Breakdown time, minutes |
| --- | --- | --- | --- | --- |
| | | Isopropyl ether | Secondary butyl alcohol | |
| Isopropyl ether | 0 | 100 | 0 | 35 |
| #1 | 7 | 100 | 0 | 240 |
| #2 | 7 | 90 | 10 | 690 |

\* Test run on gasolines to determine resistivity to oxidation. Conducted by placing 20 cc. of the sample in a glass vial which is placed in a metallic bomb under a pressure of 100 lbs. per sq. in. The metallic bomb is then placed in a steam bath at 100° C. and the pressure permitted to rise to a maximum which is noted. The bomb is maintained at a temperature of 100° C. until the pressure drops 2 lbs. below the maximum pressure obtained. The length of time necessary for sufficient oxidation of the gasoline to occur in order to cause the pressure to drop 2 lbs. per sq. in. is taken as the breakdown time.

Additional blends were prepared and the breakdown time determined as well as the C. F. R. octane number with the results as follows:

| Blend | Inhibitor (mg. alpha naphthol per 100 cc.) | Volume, percent | | Breakdown time, minutes | C. F. R. octane number |
| --- | --- | --- | --- | --- | --- |
| | | Isopropyl ether | Secondary butyl alcohol | | |
| #3 | 7 | 90 | 10 | 690 | 100 |
| #4 | 3 | 90 | 10 | 620 | 99.5 |
| #5 | 7 | 75 | 25 | 1010 | 97.8 |

*Example 2*

Further ether blends were prepared using as an inhibitor an amino phenolic compound with the following results:

| Blend | Inhibitor (mg. of amino phenolic inhibitor per 100 cc.) | Isopropyl ether | Secondary butyl alcohol | Breakdown time, minutes | |
| --- | --- | --- | --- | --- | --- |
| | | | | 2# drop | 5# drop |
| #6 | 4 | 100 | 0 | 288 | 324 |
| #7 | 4 | 90 | 10 | 360+ | 360+ |

The present invention is not to be limited by any theory or mode of operation.

I claim:

1. Stabilized ether composition comprising isopropyl ether, 5% to 30% of secondary butyl alcohol, based upon the volume of isopropyl ether, and from 3 to 7 mg. of alpha napthol per 100 cc. of isopropyl ether.

2. Stabilized ether composition comprising isopropyl ether, 5 to 30% of secondary butyl alcohol, based upon the volume of isopropyl ether, and from approximately 2 to 8 milligrams of phenolic oxidation inhibitor per 100 ccs. of ether alcohol composition.

JOHN HOOTON.